United States Patent
Takasu (10) Patent No.: US 10,455,111 B2
(45) Date of Patent: Oct. 22, 2019

(54) ENCRYPTION DEVICE, COMPUTER-READABLE RECORDING MEDIUM, AND ENCRYPTION METHOD

(71) Applicant: MegaChips Corporation, Osaka-shi (JP)

(72) Inventor: Nobuyuki Takasu, Osaka (JP)

(73) Assignee: MEGACHIPS CORPORATION, Osaka-shi (JP)

( * ) Notice: Subject to any disclaimer, the term of this patent is extended or adjusted under 35 U.S.C. 154(b) by 287 days.

(21) Appl. No.: 15/472,748

(22) Filed: Mar. 29, 2017

(65) Prior Publication Data
US 2017/0289390 A1 Oct. 5, 2017

(30) Foreign Application Priority Data
Mar. 31, 2016 (JP) .................... 2016-072107

(51) Int. Cl.
*G06F 21/00* (2013.01)
*H04N 1/32* (2006.01)
*H04N 1/44* (2006.01)
*H04L 9/06* (2006.01)

(52) U.S. Cl.
CPC ....... *H04N 1/32272* (2013.01); *H04L 9/0656* (2013.01); *H04N 1/4486* (2013.01); *H04N 1/4493* (2013.01); *H04L 2209/04* (2013.01); *H04N 2201/3281* (2013.01)

(58) Field of Classification Search
CPC ............. H04N 1/32272; H04N 1/4493; H04N 1/4486; H04N 2201/3281; H04L 9/0656; H04L 2209/04
See application file for complete search history.

(56) References Cited

U.S. PATENT DOCUMENTS

| | | | |
|---|---|---|---|
| 2005/0270371 A1* | 12/2005 | Sablak | ...................... G06T 3/00 348/143 |
| 2006/0233361 A1 | 10/2006 | Hasegawa et al. | |
| 2007/0291939 A1* | 12/2007 | Singh | .................. H04L 63/0428 380/210 |
| 2008/0267403 A1* | 10/2008 | Boult | .................... H04L 9/0894 380/255 |
| 2009/0323950 A1* | 12/2009 | Nakagata | .................. G09C 5/00 380/243 |
| 2011/0019816 A1* | 1/2011 | Inami | .................... G06F 21/608 380/28 |

(Continued)

FOREIGN PATENT DOCUMENTS

JP 2006-270343 10/2006
WO WO 2004/086672 A1 10/2004

*Primary Examiner* — Brandon S Hoffman
*Assistant Examiner* — William A Corum, Jr.
(74) *Attorney, Agent, or Firm* — Xsensus, LLP (57) ABSTRACT

An encryption circuit includes a fundamental vector generation circuit configured to generate a random number sequence for serving as a fundamental vector based on an initial vector, an image mask generation circuit configured to generate an image mask with a mask value set for each pixel in a region to be encrypted smaller than a frame size of the image, based on the fundamental vector and coordinate information for specifying the region to be encrypted, and an XOR operation circuit configured to compute an exclusive OR between each mask value of the image mask and each pixel value of the image data to generate encrypted image data.

16 Claims, 7 Drawing Sheets

(56) References Cited

U.S. PATENT DOCUMENTS

| | | | |
|---|---|---|---|
| 2011/0158470 A1* | 6/2011 | Martin | H04N 19/647 |
| | | | 382/100 |
| 2011/0286596 A1* | 11/2011 | Gressel | H04L 9/0637 |
| | | | 380/268 |
| 2012/0191984 A1* | 7/2012 | Ohyama | H04L 9/0637 |
| | | | 713/189 |
| 2015/0145992 A1* | 5/2015 | Traff | G06T 11/60 |
| | | | 348/143 |
| 2015/0304102 A1* | 10/2015 | Nakano | H04L 9/003 |
| | | | 713/189 |
| 2016/0085945 A1* | 3/2016 | Moshe | G06F 21/10 |
| | | | 726/28 |
| 2016/0380760 A1* | 12/2016 | Campos Canton | H04L 9/001 |
| | | | 380/28 |

\* cited by examiner

ENCRYPTION DEVICE, COMPUTER-READABLE RECORDING MEDIUM, AND ENCRYPTION METHOD

CROSS REFERENCE TO RELATED APPLICATIONS

The present application is based on, and claims priority from Japanese Patent Application Serial Number 2016-072107, the disclosure of which is hereby incorporated by reference herein in its entirety.

BACKGROUND

Technical Field

The present disclosure relates to an encryption device, a computer-readable recording medium, and an encryption method for encrypting image data of moving images.

Related Art

In transferring image data of moving images between multiple circuit boards, the image data may be eavesdropped on the lines between the circuit boards. The image data transferred between the circuit boards can be protected by encrypting the image data on a transmitting circuit board to send encrypted image data and decrypting the encrypted image data on a receiving circuit board.

WO2004/086672A1 describes an encryption device that generates key data on the basis of part of data extracted from previous ciphertext and encrypts next information data with the key data, in a stream cipher system in which ciphertext is generated by the exclusive OR between key data and information data.

SUMMARY

An encryption device is configured to encrypt image data in a stream cipher system. The encryption device includes a fundamental vector generation circuit configured to generate a random number sequence for serving as a fundamental vector based on an initial vector, an image mask generation circuit configured to generate an image mask with a mask value set for each pixel in a region to be encrypted smaller than a frame size of the image, based on the fundamental vector and coordinate information for specifying the region to be encrypted, and an encrypted image data generation circuit configured to compute an exclusive OR between each mask value of the image mask and each pixel value of the image data to generate encrypted image data.

A computer-readable recording medium having recorded thereon a program includes instructions for causing a computer to execute generating a random number sequence for serving as a fundamental vector based on an initial vector, generating an image mask with a mask value set for each pixel in a region to be encrypted smaller than a frame size of the image, based on the fundamental vector and coordinate information for specifying the region to be encrypted, and computing an exclusive OR between each mask value of the image mask and each pixel value of the image data to generate encrypted image data.

An encryption method includes generating a random number sequence for serving as a fundamental vector based on an initial vector, generating an image mask with a mask value set for each pixel in a region to be encrypted smaller than a frame size of the image, based on the fundamental vector and coordinate information for specifying the region to be encrypted, and computing the exclusive OR between each mask value of the image mask and each pixel value of the image data to generate encrypted image data.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

In transferring image data of moving images between circuit boards, encrypting the entire image data by a block cipher system such as AES causes prolonged processing time and increase in circuit size, and furthermore involves complicated processing required for common key exchange in addition to communicating image data.

The present disclosure is directed to obtaining an encryption device, a computer-readable recording medium, and an encryption method that achieve encryption of image data with a simple configuration and by simple processing.

An encryption device according to an aspect of the present disclosure is configured to encrypt image data in a stream cipher system. The encryption device includes a fundamental vector generation circuit configured to generate a random number sequence for serving as a fundamental vector based on an initial vector, an image mask generation circuit configured to generate an image mask with a mask value set for each pixel in a region to be encrypted smaller than a frame size of the image, based on the fundamental vector and coordinate information for specifying the region to be encrypted, and an encrypted image data generation circuit configured to compute an exclusive OR between each mask value of the image mask and each pixel value of the image data to generate encrypted image data.

In the encryption device according to this aspect, the image mask generation circuit generates an image mask with a mask value set for each pixel in a region to be encrypted smaller than a frame size of the image, on the basis of the fundamental vector and coordinate information for specifying the region to be encrypted. The encrypted image data generation circuit computes the exclusive OR between each mask value of the image mask and each pixel value of the image data to generate encrypted image data. This achieves encryption of image data of only the region to be encrypted to which the image mask is applied out of the entire frame of the image. Specifying a highly confidential and critical image portion as a region to be encrypted effectively prevents eavesdropping of a critical image portion during transfer of the image data between the circuit boards. The decryption device, in receipt of the encrypted image data, generates the image mask identical to that in the encryption device by the identical algorithm, and computes the exclusive OR between the image mask and the encrypted image data, to decrypt the encrypted image data. Thus only the encrypted image data needs to be sent from the encryption device to the decryption device, without key exchange between the encryption device and the decryption device. In consequence, encryption of the image data is achieved by simple configuration and processing, in comparison with encryption of the entire image data by a block cipher system such as AES.

In some embodiments, the image mask generation circuit is configured to employ different effective data length for generating the mask value out of the entire data length of the fundamental vector, based on strength-specifying information for specifying encryption strength, to variably specify randomness of the mask value.

According to such embodiments, image mask generation circuit employs different effective data length for generating the mask value out of the entire data length of the fundamental vector, on the basis of strength-specifying information for specifying encryption strength, to variably specify randomness of the mask value. With the encryption strength being set high, the randomness of the mask value is increased, and accordingly the degree of scrambling of the region to be encrypted is also increased. In contrast, with the encryption strength being set low, the randomness of the mask value is decreased, and accordingly the degree of scrambling of the region to be encrypted is also decreased. This achieves arbitrarily specifying the degree of scrambling of a region to be encrypted, depending on properties such as confidentiality of the image portion to be specified as a region to be encrypted.

In some embodiments, the encryption device is configured to allow specifying a plurality of regions to be encrypted in one frame of an image by the coordinate information, and specifying different encryption strength for each of the regions to be encrypted by the strength-specifying information.

According to such embodiments, a plurality of regions to be encrypted is specified in one frame of an image by the coordinate information, and different encryption strength is specified for each of the regions to be encrypted by the strength-specifying information. This achieves arbitrarily specifying the degree of scrambling of each region to be encrypted, depending on properties such as confidentiality of each image portion specified as the region to be encrypted. For example, the encryption strength can be set high for a highly confidential and critical image portion, while it can be set low for an image portion where the original image is preferably guessed for purposes such as charging.

In some embodiments, the fundamental vector generation circuit is configured to generate the fundamental vector having a data length smaller than a data size of one frame of an image. The image mask generation circuit is configured to rearrange the random number sequence of the fundamental vector in a different sequence for each image line to specify the mask value of each line of image the mask.

According to such embodiments, the fundamental vector generation circuit generates the fundamental vector having a data length smaller than the data size of one frame of an image. The image mask generation circuit rearranges the random number sequence of the fundamental vector to specify the mask value of each line of the image mask. Thus simplification of circuit configuration and processing is achieved with no need for generating a fundamental vector having a data length equivalent to a data size of one frame. The image mask generation circuit rearranges the random number sequence of the fundamental vector in a different sequence for each image line. Since adjacent image lines of image data are generally correlative, rearranging the random number sequence in a different sequence for each image line reduces the correlation, and in consequence enhances the randomness of the mask value in the image mask.

In some embodiments, the fundamental vector generation circuit is configured to generate the fundamental vector having a power-of-two-byte length. The image mask generation circuit is configured to specify different offset value and pitch value for each image line for rearranging the random number sequence of the fundamental vector, while setting the pitch value to a value that is not a power of two.

According to such embodiments, the image mask generation circuit specifies different offset value and pitch value for each image line in generating the mask value. This achieves rearranging the random number sequence of the fundamental vector in a different sequence for each image line in a simple manner. The fundamental vector generation circuit generates the fundamental vector having a power-of-two-byte length, while the image mask generation circuit sets the pitch value to a value that is not a power of two. This helps avoid repeated use of only a specific byte of the fundamental vector in generating the mask value, and in consequence, enhances randomness of the mask value.

In some embodiments, the encryption device further includes an initial vector generation circuit configured to use the encrypted image data generated for a frame as a basis for generating the initial vector for a subsequent frame.

According to such embodiments, the initial vector generation circuit uses the encrypted image data generated for a frame as a basis for generating the initial vector for a subsequent frame. Since the fundamental vector is updated by updating the initial vector for each frame, the image data is appropriately encrypted with a new fundamental vector for each frame of the image data. Updating the initial vector by self-circulation achieves reduction in communication traffic, with no need for communication for synchronizing the initial vector between the encryption device and the decryption device.

A computer-readable recording medium having recorded thereon a program according to an aspect of the present disclosure includes instructions for causing a computer to execute generating a random number sequence for serving as a fundamental vector based on an initial vector, generating an image mask with a mask value set for each pixel in a region to be encrypted smaller than a frame size of the image, based on the fundamental vector and coordinate information for specifying the region to be encrypted, and computing an exclusive OR between each mask value of the image mask and each pixel value of the image data to generate encrypted image data.

In the computer-readable recording medium having recorded thereon a program according to this aspect, the image mask with a mask value set for each pixel in a region to be encrypted smaller than a frame size of the image is generated based on the fundamental vector and coordinate information for specifying the region to be encrypted. The encrypted image data is generated by computing the exclusive OR between each mask value of the image mask and each pixel value of the image data. This achieves encryption of image data of only the region to be encrypted to which the image mask is applied out of the entire frame of the image. Specifying a highly confidential and critical image portion as a region to be encrypted effectively prevents eavesdropping of a critical image portion during transfer of the image data between the circuit boards. The decryption device, in receipt of the encrypted image data, generates the image mask identical to that in the encryption device by the identical algorithm, and computes the exclusive OR between the image mask and the encrypted image data, to decrypt the encrypted image data. Thus only the encrypted image data needs to be sent from the encryption device to the decryption device, without key exchange between the encryption device and the decryption device. In consequence, encryption of the image data is achieved by simple configuration and processing, in comparison with encryption of the entire image data by a block cipher system such as AES.

An encryption method according to an aspect of the present disclosure includes generating a random number sequence for serving as a fundamental vector based on an initial vector, generating an image mask with a mask value set for each pixel in a region to be encrypted smaller than a frame size of the image, based on the fundamental vector and coordinate information for specifying the region to be encrypted, and computing the exclusive OR between each mask value of the image mask and each pixel value of the image data to generate encrypted image data.

In the method according to this aspect, the image mask with a mask value set for each pixel in a region to be encrypted smaller than a frame size of the image is generated on the basis of the fundamental vector and coordinate information for specifying the region to be encrypted. The encrypted image data is generated by computing the exclusive OR between each mask value of the image mask and each pixel value of the image data. This achieves encryption of image data of only the region to be encrypted to which the image mask is applied out of the entire frame of the image. Specifying a highly confidential and critical image portion as a region to be encrypted effectively prevents eavesdropping of a critical image portion during transfer of the image data between the circuit boards. The decryption device, in receipt of the encrypted image data, generates the image mask identical to that in the encryption device by the identical algorithm, and computes the exclusive OR between the image mask and the encrypted image data, to decrypt the encrypted image data. Thus only the encrypted image data needs to be sent from the encryption device to the decryption device, without key exchange between the encryption device and the decryption device. In consequence, encryption of the image data is achieved by simple configuration and processing, in comparison with encryption of the entire image data by a block cipher system such as AES.

The present disclosure provides encryption of image data by simple configuration and processing.

These and other objects, features, aspects and advantages of the present disclosure will become more apparent from the following detailed description when taken in conjunction with the accompanying drawings.

Description of Embodiments

Embodiments of the present disclosure are described in detail below referring to the drawings. It should be noted that identical reference numerals throughout the drawings indicate identical or equivalent elements.

Figure 1:
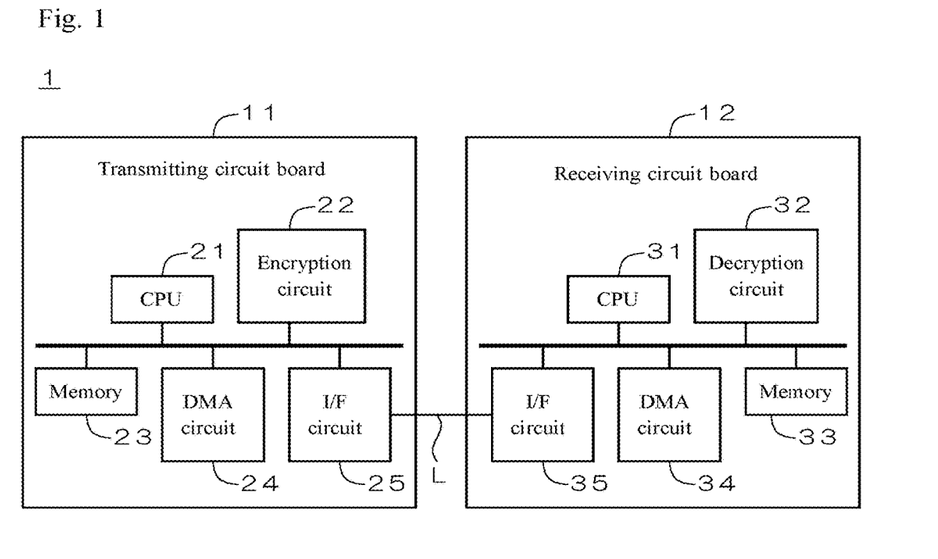
FIG. 1 is a diagram illustrating a configuration of a data processing system according to an embodiment of the present disclosure.

FIG. 1 is a diagram illustrating a configuration of a data processing system 1 according to an embodiment of the present disclosure. As illustrated in FIG. 1, the data processing system 1 includes a transmitting circuit board 11 and a receiving circuit board 12 connected to each other via a line L. For example, the receiving circuit board 12 may be a circuit board that performs primary data processing in the data processing system 1, while the transmitting circuit board 11 may be a circuit board that performs secondary data processing such as graphics.

The transmitting circuit board 11 includes a CPU 21, an encryption circuit 22, a memory 23, a Direct Memory Access (DMA) circuit 24, and an interface circuit 25, all of which are connected to a bus. The memory 23 holds non-encrypted image data of moving images. The encryption circuit 22 may be provided within the DMA circuit 24 as a part of function of the DMA circuit 24. The transmitting circuit board 11 encrypts the image data read from the memory 23 with the encryption circuit 22 to generate encrypted image data, and sends the encrypted image data to the receiving circuit board 12 via the line L.

The receiving circuit board 12 includes a CPU 31, a decryption circuit 32, a memory 33, a DMA circuit 34, and an interface circuit 35, all of which are connected to a bus. The decryption circuit 32 may be provided within the DMA circuit 34 as a part of function of the DMA circuit 34. The receiving circuit board 12 decrypts the encrypted image data received from the transmitting circuit board 11 with the decryption circuit 32 to reconstitute non-encrypted image data, and store the image data in the memory 33.

Figure 2:
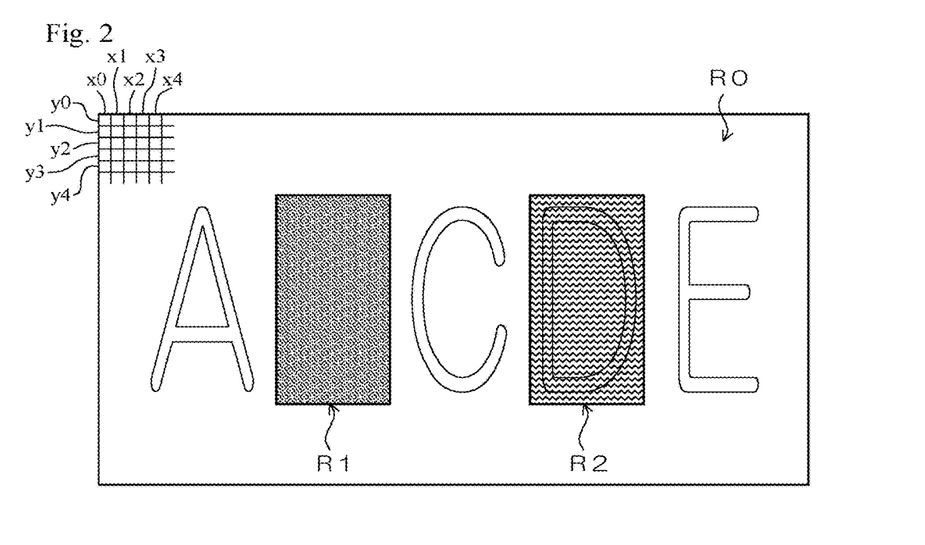
FIG. 2 is a diagram illustrating an example of encryption of image data by an encryption circuit.

FIG. 2 is a diagram illustrating an example of encryption of image data by the encryption circuit 22. The encryption circuit 22 allows arbitrarily specifying one or more regions to be encrypted in a frame by coordinate information D12 for specifying a region out of an entire frame to be encrypted. The region to be encrypted can have any size smaller than the frame size. Alternatively, the entire frame can be specified as the region to be encrypted, by setting the size of the region to the frame size. In the example as illustrated in FIG. 2, image portions corresponding to "B" and "D" in the frame showing a logotype "ABCDE" are specified as regions to be encrypted R1 and R2. In the encryption circuit 22, the position of each pixel is defined by an x coordinate along the horizontal axis (x-axis) and a y coordinate along the vertical axis (y-axis) of the frame, with the top-left corner of the frame as an origin point.

The encryption circuit 22 also allows arbitrarily specifying a degree of scrambling of the image in the region to be encrypted by strength-specifying information D13 for specifying encryption strength. In the example as illustrated in FIG. 2, with the encryption strength of a region to be encrypted R1 being set high and thus the degree of scrambling being high, the letter "B" is illegible. In contrast, with the encryption strength of a region to be encrypted R2 being set low and thus the degree of scrambling being low, the letter "D" is legible enough to roughly guess the letter. The image in a region not to be encrypted R0 other than the regions to be encrypted R1 and R2 is not scrambled.

Figure 3:
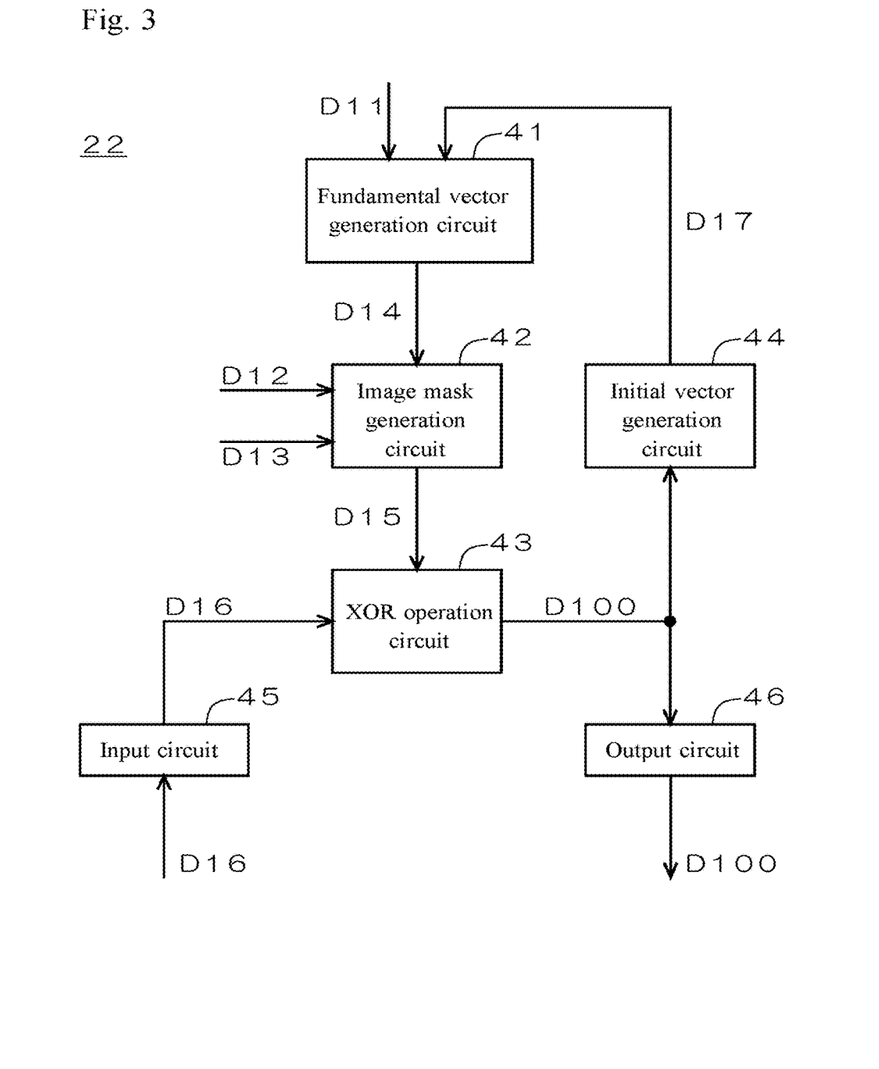
FIG. 3 is a diagram illustrating a configuration of the encryption circuit.

FIG. 3 is a diagram illustrating a configuration of the encryption circuit 22. FIG. 3 illustrates a connection in the encryption circuit 22 including a fundamental vector generation circuit 41, an image mask generation circuit 42, an XOR operation circuit 43, an initial vector generation circuit 44, an input circuit 45, and an output circuit 46. In the example according to the present embodiment, the encryption circuit 22 employs a stream cipher system in the OFB mode, and includes the image mask generation circuit 42 and the initial vector generation circuit 44 in addition to the fundamental vector generation circuit 41 and the XOR operation circuit 43 that are required for general OFB configuration.

The fundamental vector generation circuit 41 generates a fundamental vector D14, which is a random number sequence, on the basis of initial vectors D11 and D17. The initial vectors D11 and D17 and the fundamental vector D14 have a predetermined data length. In the example according to the present embodiment, the initial vectors D11 and D17 have a data length of 8 bytes, while the fundamental vector D14 has a data length of 2048 bytes. In other words, the fundamental vector D14 is a random number sequence having 2048 bytes. In this Specification, a random number having a specific 1 byte out of 2048 bytes is represented by N[n] (where n is a number from 0 to 2047). The data length of the fundamental vector D14 is sufficiently smaller than the data size of one frame of an image.

The fundamental vector generation circuit 41 generates the fundamental vector D14 having 2048 bytes from the initial vectors D11 and D17 having 8 bytes, by an arbitrary encryption algorithm. For example, the fundamental vector D14 having 2048 bytes is generated by performing Blowfish 256 times on the initial vectors D11 and D17 having 8 bytes. Another encryption algorithm such as AES may be employed. The fundamental vector generation circuit 41 generates one fundamental vector D14 for one frame, to input the fundamental vector D14 to the image mask generation circuit 42.

The image mask generation circuit 42 generates an image mask D15 with a mask value set for each pixel, on the basis of the fundamental vector D14. The image mask generation circuit 42 receives the coordinate information D12 and the strength-specifying information D13 of a region to be encrypted. The coordinate information D12 and the strength-specifying information D13 may be arbitrarily specified by a user, depending on, for example, the importance of the image, or may be automatically specified by an external system. For example, the information may be automatically specified on the basis of results of facial recognition or motion recognition from a security camera system.

The strength-specifying information D13 specifies an encryption strength M. In the example according to the present embodiment, the encryption strength M ranges between "2048" at maximum, which is the equivalent of the data length of the fundamental vector D14, and "0" at minimum.

To facilitate the description, the value of the encryption strength M is assumed to be set to "2048", "8", or "0" in the example according to the present embodiment. If the value of the encryption strength M is "2048", the mask value is specified using the entire length of the fundamental vector D14 having 2048 bytes, which increases the randomness of the mask value. If the value of the encryption strength M is "8", the mask value is specified using specific 8 bytes (such as top 8 bytes) in the fundamental vector D14, which decreases the randomness of the mask value. If the value of the encryption strength M is "0", the mask value is set to "0", and thus the image data is not encrypted. In other words, the image mask generation circuit 42 variably specifies the randomness of the mask value by employing different effective data length for generating the image mask D15 out of the entire data length of the fundamental vector D14, on the basis of the strength-specifying information D13.

Figure 4:
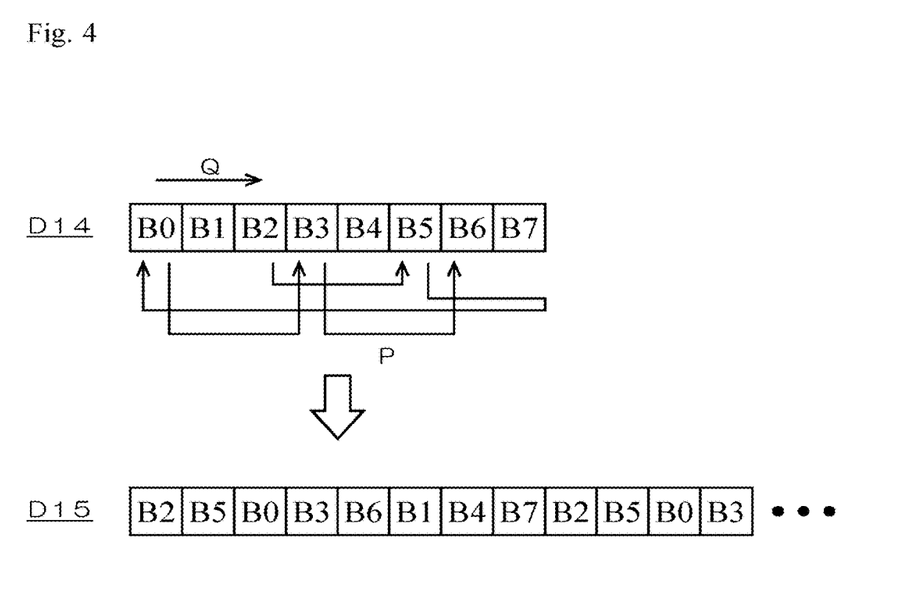
FIG. 4 is a diagram for illustrating a method for generating an image mask from a fundamental vector.

FIG. 4 is a diagram for illustrating a method for generating the image mask D15 from the fundamental vector D14 for one image line by the image mask generation circuit 42. FIG. 4 illustrates an example of the encryption strength M being set to "8". With the encryption strength M being set to "8", the effective data length of the fundamental vector D14 is 8 bytes including the byte B0 to the byte B7.

The image mask generation circuit 42 specifies a pitch value P and an offset value Q for each image line along the y-axis. More specifically, the image mask generation circuit 42 sets the pitch value P(y) and the offset value Q(y) of each image line to a different value from those of an adjacent image line, in accordance with the following equation.

$$P(y)=N[(y+P(y-1))\% M]$$

$$Q(y)=N[(y+Q(y-1))\% M]$$

where $$P(-1)=0$$

$$Q(-1)=1$$

If the pitch value P(y) as obtained in accordance with the above equation is a power of two, the image mask generation circuit 42 adds, for example, "1" to the pitch value P(y) to set it to a value that is not a power of two.

The image mask generation circuit 42 rearranges the random number sequence of the fundamental vector D14 on the basis of the pitch value P(y) and the offset value Q(y) as set, to generate the image mask D15. More specifically, the image mask generation circuit 42 specifies the mask value MASK (x, y, M) for a pixel with coordinates (x, y), in accordance with the following equation. The effective data length of the fundamental vector D14 is specified with the encryption strength M.

$$MASK(x,y,M)=N[(P(y)*x+Q(y))\% M]$$

In the example as illustrated in FIG. 4, the pitch value P is set to "3", and the offset value Q is set to "2". Thus the top byte of the image mask D15 is the byte B2, which is 2 bytes from the top byte B0 of the fundamental vector D14. The second byte of the image mask D15 is the byte B5, which is 3 bytes away from the byte B2 in the fundamental vector D14. Similarly, the bytes away by 3 bytes (going back to the top after the last byte) in the fundamental vector D14 are sequentially arranged to generate the image mask D15. Each byte of the image mask D15 represents the mask value MASK corresponding to each pixel. For example, in the image line to which the image mask D15 as illustrated in FIG. 4 is applied, the byte B2 is applied as the 0-th mask value to the 0-th column (x=0), and the byte B5 is applied as the first mask value to the first column (x=1). The image mask generation circuit 42 inputs the generated image mask D15 to the XOR operation circuit 43.

The XOR operation circuit 43 computes the exclusive OR between each mask value of the image mask D15 and each pixel value of image data D16 received from the input circuit 45. Each pixel value is thus encrypted. The XOR operation circuit 43 sequentially performs the above operation on all pixels in the image data D16, to generate encrypted image data D100. The encrypted image data D100 is output from the output circuit 46 and sent to the receiving circuit board 12. The encrypted image data D100 is also input to the initial vector generation circuit 44.

The initial vector generation circuit 44 uses the encrypted image data D100 generated for a certain frame as a basis for generating the initial vector D17 for a subsequent frame. For example, predetermined, specific 8 bytes (such as top 8 bytes) in the encrypted image data D100 are extracted to generate the initial vector D17.

Figure 5:
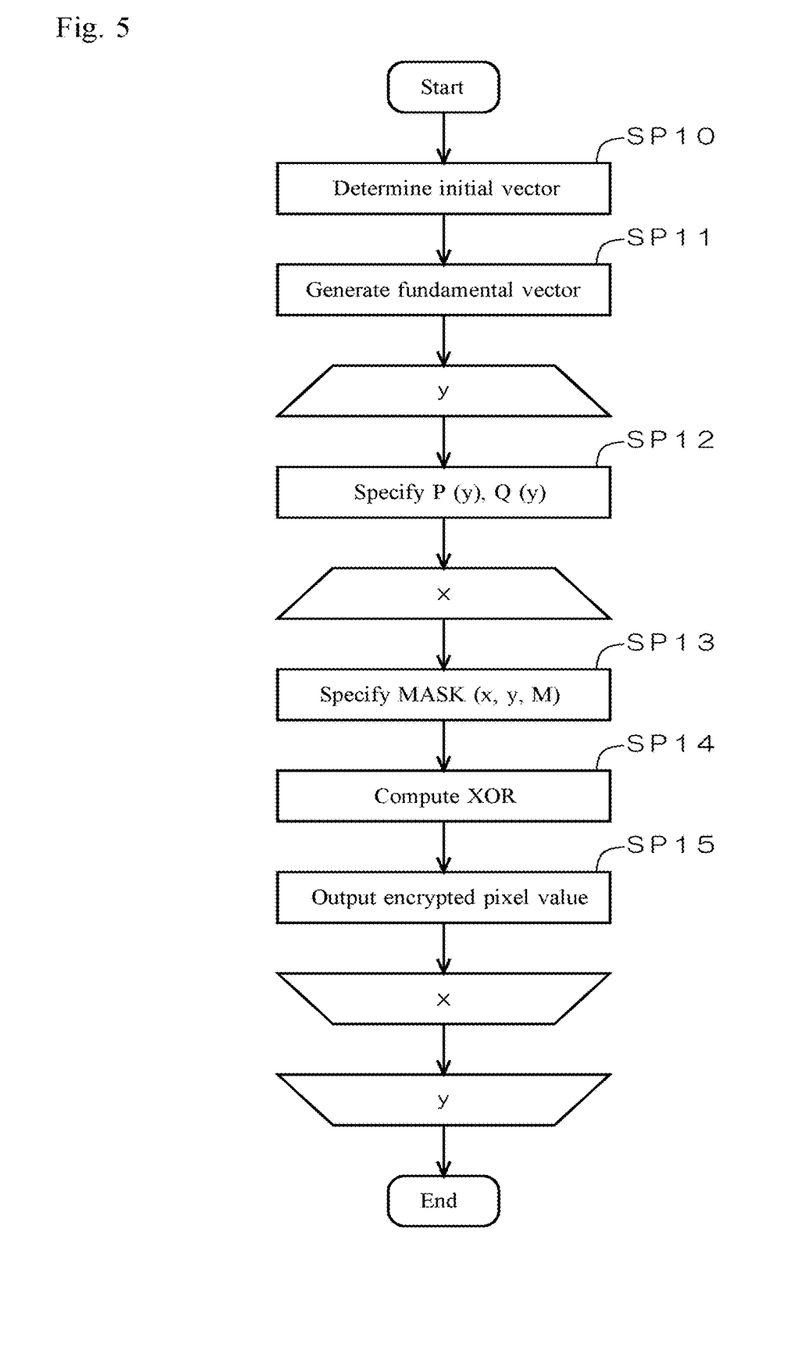
FIG. 5 is a flow chart to illustrate operations of the encryption circuit.

FIG. 5 is a flow chart to illustrate operations of the encryption circuit 22. When encryption is started upon receipt of the top frame of a sequence, the initial vector D11 is determined in Step SP10. A designated random number is employed as the first initial vector D11.

In Step SP11, the fundamental vector generation circuit 41 generates the fundamental vector D14 on the basis of the initial vector D11.

In Step SP12, the image mask generation circuit 42 specifies the pitch value P (0) and the offset value Q (0) for the image line in the 0-th row (y=0).

In Step SP13, the image mask generation circuit 42 specifies the mask value MASK (0, 0, M) for the pixel in the 0-th column (x=0) belonging to the image line in the 0-th row, on the basis of the fundamental vector D14, the coordinate information D12, and the strength-specifying information D13.

In Step SP14, the XOR operation circuit 43 computes the exclusive OR between the mask value (0, 0, M) received from the image mask generation circuit 42 and the pixel value at the coordinates (0, 0) received from the input circuit 45, to encrypt the pixel value at the coordinates (0, 0).

In Step SP15, the output circuit 46 outputs the encrypted pixel value at the coordinates (0, 0).

By updating the coordinate x, the processes in Steps SP13 to SP15 are sequentially performed on all pixels belonging to the image line in the 0-th row.

When the processes for the image line in the 0-th row are completed, the same processes are performed on the image line in the first row (y=1). Similarly by updating the coordinate y, the processes in Steps SP12 to SP15 are sequentially performed on all image lines in the frame. Encryption of the top frame terminates on completion of the processes for all pixels in the frame.

In encryption of the subsequent frame, the initial vector D17 is employed in place of the initial vector D11. The initial vector generation circuit 44, which holds the encrypted pixel value output from the XOR operation circuit 43 during encryption of the top frame, extracts an encrypted pixel value of a predetermined, specific region (such as top 8 bytes) from the encrypted pixel value of the entire frame, to generate the initial vector D17 for the subsequent frame.

Figure 6:
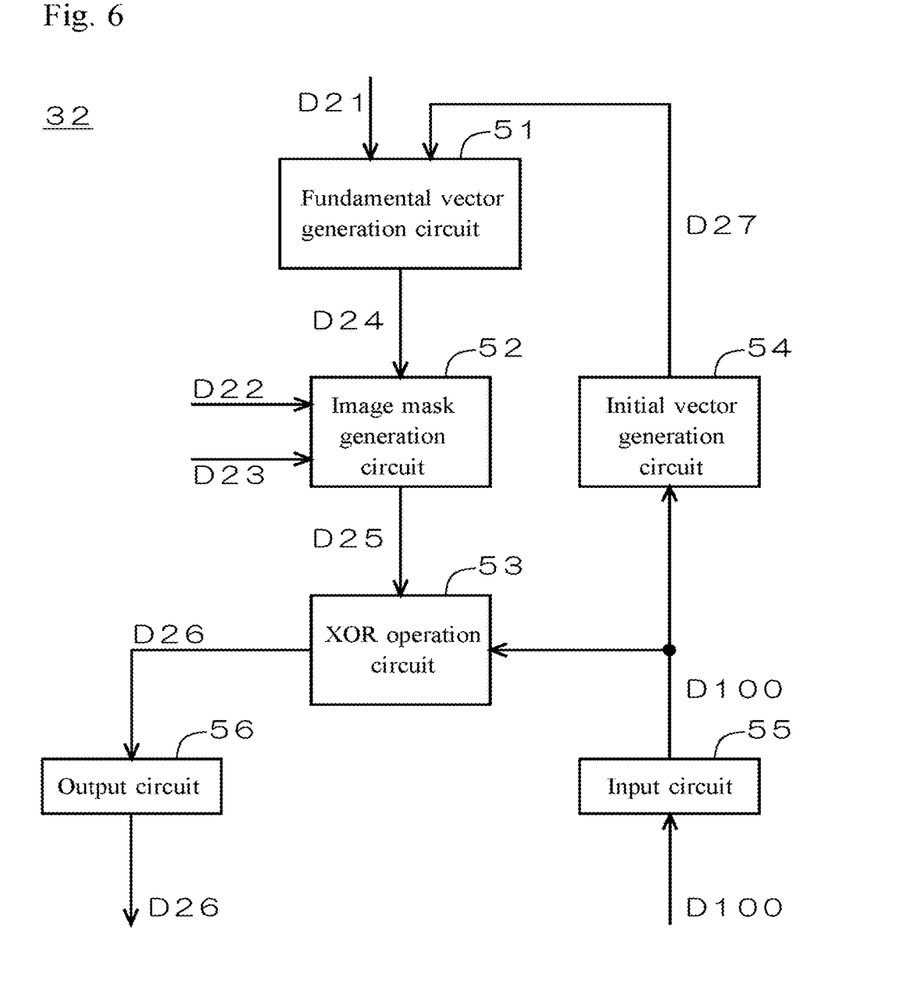
FIG. 6 is a diagram illustrating a configuration of a decryption circuit.

FIG. 6 is a diagram illustrating a configuration of the decryption circuit 32. FIG. 6 illustrates a connection in the decryption circuit 32 including a fundamental vector generation circuit 51, an image mask generation circuit 52, an XOR operation circuit 53, an initial vector generation circuit 54, an input circuit 55, and an output circuit 56. The decryption circuit 32 is different from the encryption circuit 22 in that, inter alia, the XOR operation circuit 53 and the initial vector generation circuit 54 receive the encrypted image data D100 from the input circuit 55 and that the XOR operation circuit 53 outputs decrypted image data D26.

The fundamental vector generation circuit 51 generates a fundamental vector D24 similar to the fundamental vector D14, on the basis of the initial vectors D21 and D27 respectively similar to the initial vectors D11 and D17.

The image mask generation circuit 52 generates an image mask D25 similar to the image mask D15, on the basis of the fundamental vector D24. The image mask generation circuit 52 receives coordinate information D22 and strength-specifying information D23 respectively similar to the coordinate information D12 and the strength-specifying information D13.

The XOR operation circuit 53 computes the exclusive OR between each mask value of the image mask D25 and each pixel value of the encrypted image data D100 received from the input circuit 55. Each pixel value is thus decrypted. The XOR operation circuit 53 sequentially performs the above operation on all pixels in the encrypted image data D100, to generate non-encrypted image data D26 similar to the image data D16.

The initial vector generation circuit 54 uses the encrypted image data D100 for a certain frame as a basis for generating the initial vector D27 for a subsequent frame similar to the initial vector D17.

Figure 7:
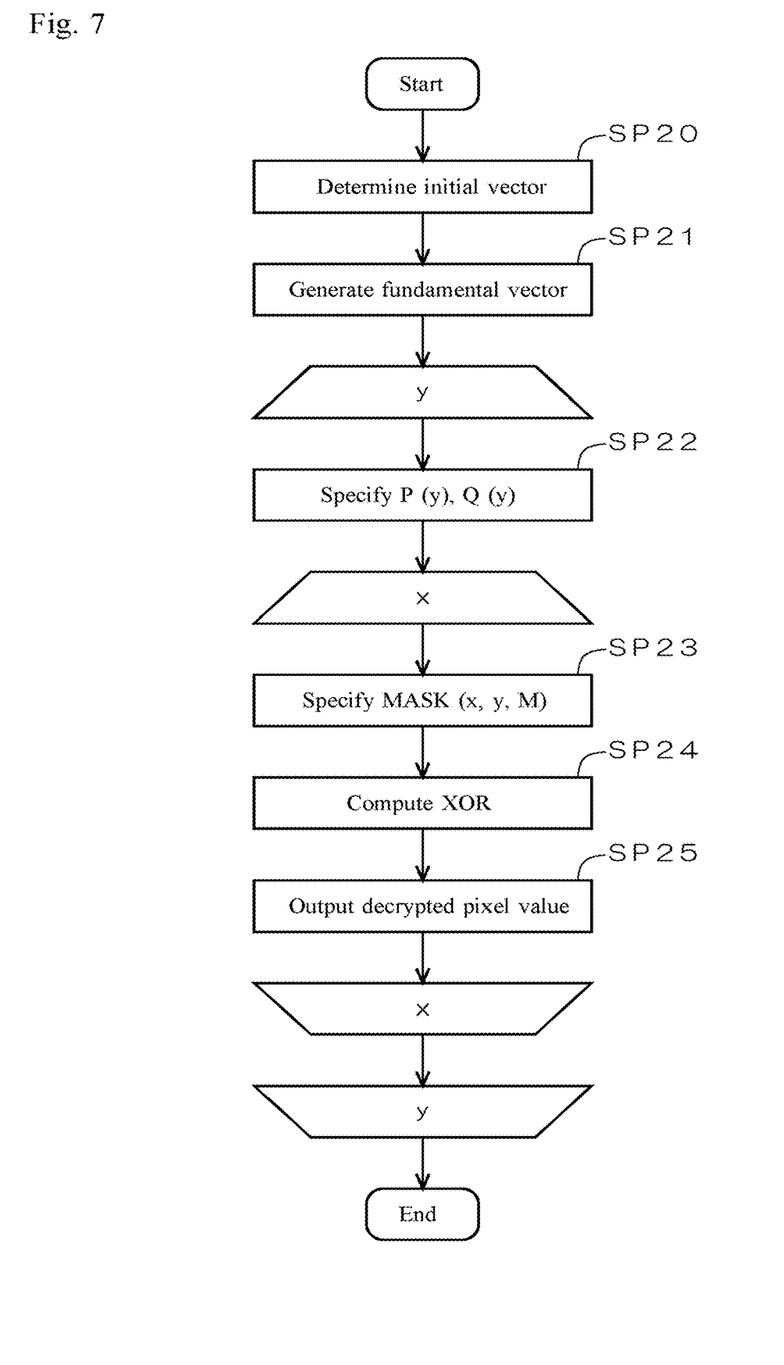
FIG. 7 is a flow chart to illustrate operations of the decryption circuit.

FIG. 7 is a flow chart to illustrate operations of the decryption circuit 32. When decryption is started upon receipt of the top frame of a sequence, the initial vector D21 is determined in Step SP20.

In Step SP21, the fundamental vector generation circuit 51 generates the fundamental vector D24 on the basis of the initial vector D21.

In Step SP22, the image mask generation circuit 52 specifies the pitch value P (0) and the offset value Q (0) for the image line in the 0-th row (y=0) in a similar way to the image mask generation circuit 42.

In Step SP23, the image mask generation circuit 52 specifies the mask value MASK (0, 0, M) for the pixel in the 0-th column (x=0) belonging to the image line in the 0-th row, on the basis of the fundamental vector D24, the coordinate information D22, and the strength-specifying information D23, in a similar way to the image mask generation circuit 42.

In Step SP24, the XOR operation circuit 53 computes the exclusive OR between the mask value (0, 0, M) received from the image mask generation circuit 52 and the encrypted pixel value at the coordinates (0, 0) received from the input circuit 55, to decrypt the pixel value at the coordinates (0, 0).

In Step SP25, the output circuit 56 outputs the decrypted pixel value at the coordinates (0, 0).

By updating the coordinate x, the processes in Steps SP23 to SP25 are sequentially performed on all pixels belonging to the image line in the 0-th row.

When the processes for the image line in the 0-th row are completed, the same processes are performed on the image line in the first row (y=1). Similarly by updating the coordinate y, the processes in Steps SP22 to SP25 are sequentially performed on all image lines in the frame. Decryption of the top frame terminates on completion of the processes for all pixels in the frame.

In decryption of the subsequent frame, the initial vector D27 is employed in place of the initial vector D21. The initial vector generation circuit 54, which holds the encrypted pixel value output from the input circuit 55 during decryption of the top frame, extracts an encrypted pixel value of a specific region from the encrypted pixel value of the entire frame, to generate the initial vector D27 for the subsequent frame, in a similar way to the initial vector generation circuit 44.

Figure 8:
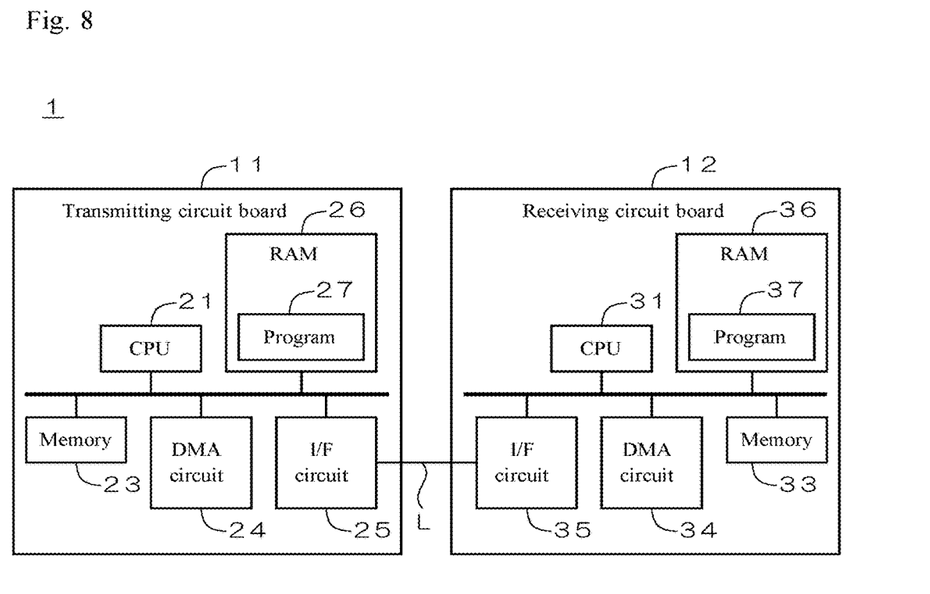
FIG. 8 is a diagram illustrating a configuration of the encryption circuit and the decryption circuit being realized by CPUs.

FIGS. 3 and 6 illustrate an example of the encryption circuit 22 and the decryption circuit 32 being configured as hardware. Instead of this configuration, the functions of the encryption circuit 22 and the decryption circuit 32 may be realized by software processing with a computer. FIG. 8 is a diagram illustrating a configuration of the encryption circuit 22 and the decryption circuit 32 being realized by CPUs 21 and 31. A RAM 26 holds a program 27 read from a computer-readable recording medium. The CPU 21 performs the program 27 read from the RAM 26, so as to function as fundamental vector generation means, image mask generation means, XOR operation means, and initial vector generation means, respectively equivalent to the fundamental vector generation circuit 41, the image mask generation circuit 42, the XOR operation circuit 43, and the initial vector generation circuit 44 illustrated in FIG. 3. In other words, the program 27 causes the CPU 21 to function as fundamental vector generation means, image mask generation means, XOR operation means, and initial vector generation means. Similarly, the CPU 31 performs a program 37 read from a RAM 36, so as to function as fundamental vector generation means, image mask generation means, XOR operation means, and initial vector generation means, respectively equivalent to the fundamental vector generation circuit 51, the image mask generation circuit 52, the XOR operation circuit 53, and the initial vector generation circuit 54 illustrated in FIG. 6. In other words, the program 37 causes the CPU 31 to function as fundamental vector generation means, image mask generation means, XOR operation means, and initial vector generation means.

As described above, in the encryption circuit 22 according to the present embodiment, the image mask generation circuit 42 generates the image mask D15 with a mask value set for each pixel in a region to be encrypted smaller than the frame size of the image, on the basis of the fundamental vector D14 and the coordinate information D12 for specifying the region to be encrypted. The XOR operation circuit 43 (encrypted image data generation circuit) computes the exclusive OR between each mask value of the image mask D15 and each pixel value of the image data D16, to generate the encrypted image data D100. This achieves encryption of image data of only the region to be encrypted to which the image mask D15 is applied out of the entire frame of the image. Specifying a highly confidential and critical image portion as a region to be encrypted effectively prevents eavesdropping of a critical image portion during transfer of the image data between the circuit boards 11 and 12. The decryption circuit 32, in receipt of the encrypted image data D100, generates the image mask D25 identical to that in the encryption circuit 22 by the identical algorithm, and computes the exclusive OR between the image mask D25 and the encrypted image data D100, to decrypt the encrypted image data D100. Thus only the encrypted image data D100 needs to be sent from the encryption circuit 22 to the decryption circuit 32, without key exchange between the encryption circuit 22 and the decryption circuit 32. In consequence, encryption of the image data is achieved by simple configuration and processing, in comparison with encryption of the entire image data by a block cipher system such as AES.

In the encryption circuit 22 according to the present embodiment, the image mask generation circuit 42 variably specifies the randomness of the mask value, by employing different effective data length for generating the mask value out of the entire data length of the fundamental vector D14, on the basis of the strength-specifying information D13 for specifying the encryption strength M. With the encryption strength M being set high, the randomness of the mask value is increased, and accordingly the degree of scrambling of the region to be encrypted is also increased. In contrast, with the encryption strength M being set low, the randomness of the mask value is decreased, and accordingly the degree of scrambling of the region to be encrypted is also decreased. This achieves arbitrarily specifying the degree of scrambling of a region to be encrypted, depending on properties such as confidentiality of the image portion to be specified as the region to be encrypted.

The encryption circuit 22 according to the present embodiment specifies multiple regions to be encrypted in one frame of the image by the coordinate information D12, and specifies different encryption strength M for each of the multiple regions to be encrypted by the strength-specifying information D13. This achieves arbitrarily specifying the degree of scrambling on each region to be encrypted, depending on properties such as confidentiality of each image portion specified as the region to be encrypted. For example, the encryption strength can be set high for a highly confidential and critical image portion, while it can be set low for an image portion where the original image is preferably guessed for purposes such as charging.

In the encryption circuit 22 according to the present embodiment, the fundamental vector generation circuit 41 generates the fundamental vector D14 having a data length smaller than the data size of one frame of the image, and the image mask generation circuit 42 specifies the mask value of each line of the image mask D15 by rearranging the random number sequence of the fundamental vector D14. Thus simplification of circuit configuration and processing is achieved with no need for generating a fundamental vector having a data length equivalent to a data size of one frame. The image mask generation circuit 42 rearranges the random number sequence of the fundamental vector D14 in a different sequence for each image line. Since adjacent image lines of image data are generally correlative, rearranging the random number sequence in a different sequence for each image line reduces the correlation, and in consequence enhances the randomness of the mask value in the image mask D15.

In the encryption circuit 22 according to the present embodiment, the image mask generation circuit 42 specifies different offset value Q and pitch value P for each image line in generating the mask value. This achieves rearranging the random number sequence of the fundamental vector D14 in a different sequence for each image line in a simple manner. The fundamental vector generation circuit 41 generates the fundamental vector D14 having a power-of-two-byte length, while the image mask generation circuit 42 sets the pitch value P to a value that is not a power of two. This helps avoid repeated use of only a specific byte of the fundamental vector D14 in generating the mask value, and in consequence, enhances randomness of the mask value.

In the encryption circuit 22 according to the present embodiment, the initial vector generation circuit 44 uses the encrypted image data D100 generated for a certain frame as a basis for generating the initial vector D17 for a subsequent frame. Since the fundamental vector D14 is updated by updating the initial vector D17 for each frame, the image data D16 is appropriately encrypted with a new fundamental vector D14 for each frame of the image data D16. Updating the initial vector D17 by self-circulation achieves reduction in communication traffic, with no need for communication for synchronizing the initial vectors D17 and D27 between the encryption circuit 22 and the decryption circuit 32.

While the invention has been described in detail, the foregoing description is in all aspects illustrative and not restrictive. It is understood that numerous other modifications and variations can be devised without departing from the scope of the invention.

What is claimed is:

1. An encryption device configured to encrypt image data in a stream cipher system, the device comprising:
processing circuitry configured to
generate a random number sequence for serving as a fundamental vector based on an initial vector,
generate an image mask, the image mask having a mask value set for each pixel in a region to be encrypted, the region to be encrypted being smaller than a frame size of the image, the image mask being generated based on the fundamental vector and coordinate information for specifying the region to be encrypted,
rearrange the random number sequence of the fundamental vector in a different sequence for each row of pixels in the image to specify the mask value of each line of the image mask, and
compute an exclusive OR between each mask value of the image mask and each pixel value of the image data to generate encrypted image data.

2. The encryption device according to claim 1, wherein the processing circuitry is further configured to
variably specify a randomness of the mask value, the randomness being based on a plurality of effective data lengths of an entire data length of the fundamental vector where each effective data length is different from the other effective data lengths, the different effective data lengths being based on strength-specifying information for specifying encryption strength.

3. The encryption device according to claim 2, wherein the device is configured to allow:
specifying a plurality of regions to be encrypted in one frame of an image by the coordinate information, and
specifying different encryption strength for each of the regions to be encrypted by the strength-specifying information.

4. The encryption device according to claim 1, wherein the processing circuitry is further configured to
generate the fundamental vector having a data length smaller than a data size of one frame of an image.

5. The encryption device according to claim 4, wherein the processing circuitry is further configured to
generate the fundamental vector having a power-of-two-byte length, and
specify different offset value and pitch value for each row of pixels in the image for rearranging the random number sequence of the fundamental vector, while setting the pitch value to a value that is not a power of two.

6. The encryption device according to claim 1, wherein the processing circuitry is further configured to
use the encrypted image data generated for a frame as a basis for generating the initial vector for a subsequent frame.

7. A non-transitory computer-readable recording medium having recorded thereon a program for causing a computer to execute instructions comprising:
generating a random number sequence for serving as a fundamental vector based on an initial vector;
generating an image mask, the image mask having a mask value set for each pixel in a region to be encrypted, the region to be encrypted being smaller than a frame size of the image, the image mask being generated based on the fundamental vector and coordinate information for specifying the region to be encrypted;
rearranging the random number sequence of the fundamental vector in a different sequence for each row of pixels in the image to specify the mask value of each line of the image mask; and
computing an exclusive OR between each mask value of the image mask and each pixel value of the image data to generate encrypted image data.

8. An encryption method comprising:
generating a random number sequence for serving as a fundamental vector based on an initial vector;
generating an image mask, the image mask having a mask value set for each pixel in a region to be encrypted, the region to be encrypted being smaller than a frame size of the image, the image mask being generated based on the fundamental vector and coordinate information for specifying the region to be encrypted;
rearranging the random number sequence of the fundamental vector in a different sequence for each row of pixels in the image to specify the mask value of each line of the image mask; and
computing an exclusive OR between each mask value of the image mask and each pixel value of the image data to generate encrypted image data.

9. The encryption method according to claim 8, further comprising:
variably specifying a randomness of the mask value, the randomness being based on a plurality of effective data lengths of an entire data length of the fundamental vector where each effective data length is different from the other effective data lengths, the different effective data lengths being based on strength-specifying information for specifying encryption strength.

10. The encryption method according to claim 9, further comprising:
specifying a plurality of regions to be encrypted in one frame of an image by the coordinate information; and
specifying different encryption strength for each of the regions to be encrypted by the strength-specifying information.

11. The encryption method according to claim 8, further comprising:
generating the fundamental vector having a data length smaller than a data size of one frame of an image.

12. The encryption method according to claim 11, further comprising:
generating the fundamental vector having a power-of-two-byte length; and
specifying different offset value and pitch value for each row of pixels in the image for rearranging the random number sequence of the fundamental vector, while setting the pitch value to a value that is not a power of two.

13. The encryption method according to claim 8, further comprising:
using the encrypted image data generated for a frame as a basis for generating the initial vector for a subsequent frame.

14. An encryption device configured to encrypt image data in a stream cipher system, the device comprising:
processing circuitry configured to
generate a random number sequence for serving as a fundamental vector based on an initial vector,
generate an image mask, the image mask having a mask value set for each pixel in a region to be encrypted, the region to be encrypted being smaller than a frame size of the image, the image mask being generated based on the fundamental vector and coordinate information for specifying the region to be encrypted,
variably specify a randomness of the mask value, the randomness being based on a plurality of effective data lengths of an entire data length of the fundamental vector where each effective data length is different from the other effective data lengths, the different effective data lengths being based on strength-specifying information for specifying encryption strength, and compute an exclusive OR between each mask value of the image mask and each pixel value of the image data to generate encrypted image data.

15. A non-transitory computer-readable recording medium having recorded thereon a program for causing a computer to execute instructions comprising:

generating a random number sequence for serving as a fundamental vector based on an initial vector;

generating an image mask, the image mask having a mask value set for each pixel in a region to be encrypted, the region to be encrypted being smaller than a frame size of the image, the image mask being generated based on the fundamental vector and coordinate information for specifying the region to be encrypted;

variably specifying a randomness of the mask value, the randomness being based on a plurality of effective data lengths of an entire data length of the fundamental vector where each effective data length is different from the other effective data lengths, the different effective data lengths being based on strength-specifying information for specifying encryption strength; and computing an exclusive OR between each mask value of the image mask and each pixel value of the image data to generate encrypted image data.

16. An encryption method comprising:

generating a random number sequence for serving as a fundamental vector based on an initial vector;

generating an image mask, the image mask having a mask value set for each pixel in a region to be encrypted, the region to be encrypted being smaller than a frame size of the image, the image mask being generated based on the fundamental vector and coordinate information for specifying the region to be encrypted;

variably specifying a randomness of the mask value, the randomness being based on a plurality of effective data lengths of an entire data length of the fundamental vector where each effective data length is different from the other effective data lengths, the different effective data lengths being based on strength-specifying information for specifying encryption strength; and computing an exclusive OR between each mask value of the image mask and each pixel value of the image data to generate encrypted image data.

* * * * *